(12) United States Patent
Murayama et al.

(10) Patent No.: US 10,888,949 B2
(45) Date of Patent: Jan. 12, 2021

(54) SPOT WELDING ELECTRODE HAVING MOVABLE PRESSING MEMBERS AND SPOT WELDING METHOD USING SAME

(71) Applicant: NIPPON STEEL & SUMITOMO METAL CORPORATION, Tokyo (JP)

(72) Inventors: Gen Murayama, Tokyo (JP); Tohru Okada, Tokyo (JP); Masanori Yasuyama, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 272 days.

(21) Appl. No.: 15/771,856

(22) PCT Filed: Oct. 31, 2016

(86) PCT No.: PCT/JP2016/082361
§ 371 (c)(1),
(2) Date: Apr. 27, 2018

(87) PCT Pub. No.: WO2017/073793
PCT Pub. Date: May 4, 2017

(65) Prior Publication Data
US 2018/0311756 A1    Nov. 1, 2018

(30) Foreign Application Priority Data

Oct. 30, 2015   (JP) .................................. 2015-214651
Nov. 27, 2015   (JP) .................................. 2015-231665

(51) Int. Cl.
| | | |
|---|---|---|
| *B23K 11/10* | (2006.01) | |
| *B23K 11/11* | (2006.01) | |
| *B23K 11/25* | (2006.01) | |
| *B23K 11/30* | (2006.01) | |
| *B23K 11/18* | (2006.01) | |

(Continued)

(52) U.S. Cl.
CPC .......... *B23K 11/115* (2013.01); *B23K 11/185* (2013.01); *B23K 11/255* (2013.01);
(Continued)

(58) Field of Classification Search
CPC ... B23K 11/115; B23K 11/185; B23K 11/255; B23K 11/315; B23K 11/3009;
(Continued)

(56) References Cited

U.S. PATENT DOCUMENTS

| | | | |
|---|---|---|---|
| 2012/0055910 A1* | 3/2012 | Sakai | B23K 11/115 219/127 |
| 2013/0092671 A1 | 4/2013 | Sakai | |

(Continued)

FOREIGN PATENT DOCUMENTS

| | | |
|---|---|---|
| CN | 103042295 A | 4/2013 |
| CN | 103180082 A | 6/2013 |

(Continued)

OTHER PUBLICATIONS

Chinese Office Action dated Dec. 3, 2019, for corresponding Chinese Application No. 201680061872.6, with English translation.

(Continued)

*Primary Examiner* — Brian W Jennison
(74) *Attorney, Agent, or Firm* — Birch, Stewart, Kolasch & Birch, LLP (57) ABSTRACT

Provided is a spot welding machine able to perform spot welding in which the desired nugget size is formed while suppressing spatter even if the strengths or thicknesses of the metal sheets change, the machine comprising: a pair of electrode tips, a pair of pressing members arranged around the tips, a first power supply, first and second drive mechanisms, and a pressing force control part, wherein the tips and the pressing members are respectively arranged facing each other so as to be able to sandwich a set of sheets between them, the first drive mechanisms give pressing forces pressing the tips against the sheets, the second drive mechanisms give pressing forces pressing the pressing members against the sheets, and the control part independently controls the pressing forces given by the first and second drive mechanisms.

10 Claims, 7 Drawing Sheets

(51) Int. Cl.
*B23K 11/31* (2006.01)
*B23K 103/04* (2006.01)
*B23K 101/00* (2006.01)
*B23K 101/18* (2006.01)
*B23K 103/10* (2006.01)

(52) U.S. Cl.
CPC ...... *B23K 11/3009* (2013.01); *B23K 11/3018* (2013.01); *B23K 11/314* (2013.01); *B23K 2101/006* (2018.08); *B23K 2101/18* (2018.08); *B23K 2103/04* (2018.08); *B23K 2103/05* (2018.08); *B23K 2103/10* (2018.08)

(58) Field of Classification Search
CPC .............. B23K 11/3018; B23K 11/314; B23K 2103/10; B23K 2101/18; B23K 2103/04; B23K 2103/05; B23K 2101/006
See application file for complete search history.

(56) References Cited

U.S. PATENT DOCUMENTS

2013/0153544 A1* 6/2013 Goto ..................... B23K 11/115
219/117.1

2016/0082543 A1 3/2016 Wakabayashi et al.
2016/0221110 A1 8/2016 Okada et al.

FOREIGN PATENT DOCUMENTS

| DE | 102010035552 A1 | 4/2011 |
|----|-----------------|--------|
| JP | 5-185242 A | 7/1993 |
| JP | 6-155039 A | 6/1994 |
| JP | 2001-276979 A | 10/2001 |
| JP | 2012-66284 A | 4/2012 |
| JP | 2013-71172 A | 4/2013 |
| JP | 2013-71173 A | 4/2013 |
| WO | WO 2014/196499 A1 | 12/2014 |
| WO | WO 2015/045351 A1 | 4/2015 |

OTHER PUBLICATIONS

Indian Office Action for corresponding Indian Application No. 201817014580, dated Jan. 23, 2020, with English translation.

* cited by examiner

SPOT WELDING ELECTRODE HAVING MOVABLE PRESSING MEMBERS AND SPOT WELDING METHOD USING SAME

FIELD

The present disclosure relates to a spot welding machine welding a set of sheets including a plurality of superposed metal sheets by resistance spot welding.

BACKGROUND

In the assembly of car bodies of automobiles, the attachment of parts, etc., mainly resistance spot welding is being used for joining a superposed plurality of metal sheets with each other. In this spot welding, a pair of electrode tips with front end parts pressed against the set of sheets is used.

In spot welding, current is run across the superposed plurality of metal sheets to form molten metal while pressing the electrode tips against the superposed plurality of metal sheets from the two sides so as to sandwich the metal sheets. After finishing running the current, due to the heat removed by the electrode tips and the heat conducted to the metal sheets themselves, the molten metal is made to cool and solidify to thereby form a melted, then solidified part with an elliptical cross-sectional shape (nugget) between the metal sheets.

Further, in welding electrodes, the art of providing pressing rods for pressing the electrode tips and metal sheets is known (PTL 1). Due to this, during welding, it is possible to press the surroundings of the weld zone and suppress spatter etc. Furthermore, by using the pressing members as auxiliary electrodes and running current through the metal sheets between the electrode tips and auxiliary electrodes, it is possible to enlarge the nugget size.

As welding electrodes having such pressing members, ones using cylindrical rigid bodies as pressing members and having electrode tips inside the rigid bodies are known (PTL 2). During welding, it is possible to press the surroundings of the weld zone and further suppress spatter etc. and to broaden the contact areas among the metal sheets and enlarge the nugget size.

CITATION LIST

Patent Literature

[PTL 1] Japanese Patent Publication No. 2012-066284A
[PTL 2] WO2015/045351A

SUMMARY

Technical Problem

However, if the strengths or thicknesses of the metal sheets change, the range of suitable current changes. Therefore, even in the prior art, such as PTLs 1 and 2, it was difficult to stably form the desired nugget size while suppressing spatter.

For example, in the case of the same sheet thickness, the range of suitable current tends to become narrower as the strength of the metal sheets increases. To secure the equivalent range of suitable current, it is necessary to increase the pressing forces of the electrode tips. However, in robot guns etc. actually used in mass production, there are limitations to the pressing force due to gun rigidity and restrictions on the servo motor torque values. For example, in the case of robot guns used in an automobile mass production line, 400 kgf or so becomes the maximum allowable pressing force.

In this regard, however, in the welding electrode provided with electrode tips and pressing members of the spring system used in the prior arts of PTL 2 etc., if replacing springs with ones with a higher spring constants to increase the pressing forces of the pressing members, due to the reaction forces, the pressing forces of the center electrode tips end up decreasing by that amount. Further, replacement of the springs each time in accordance with the strengths or thicknesses of the metal sheets was costly and not practical.

For this reason, a spot welding machine able to perform spot welding in which the desired nugget size is formed while suppressing spatter even if the strengths or thicknesses of the metal sheets change, is desirable.

Solution to Problem

The inventors studied in advance methods for solving the problem and discovered spot welding in which the pressing pressures of the electrode tips and pressing pressures of the pressing members are separately controlled.

The gist of the present disclosure is as follows:

(1) A spot welding machine welding a set of sheets including a superposed plurality of metal sheets by resistance spot welding,
said spot welding machine comprising:
a pair of electrode tips with front end parts to be pressed against said set of sheets,
a pair of pressing members arranged around said electrode tips and with front end parts to be pressed against said set of sheets,
a first power supply,
first drive mechanisms and second drive mechanisms, and
a pressing force control part, wherein
said pair of electrode tips are arranged facing each other so as to be able to sandwich said set of sheets between them,
said pair of pressing members are arranged facing each other so as to be able to sandwich said set of sheets between them,
said pair of electrode tips are connected to said first power supply and said first drive mechanisms, said first drive mechanisms driving said pair of electrode tips in the axial direction of said electrode tips and making said pair of electrode tips stop at any positions and giving pressing forces pressing said pair of electrode tips against said set of sheets,
said pair of pressing members are connected to said second drive mechanisms, said second drive mechanisms driving said pair of pressing members in the axial direction of said electrode tips and making said pair of pressing members stop at any positions and giving pressing forces pressing said pair of pressing members against said set of sheets, and
said pressing force control part is connected to said first drive mechanisms and said second drive mechanisms and independently controls the pressing forces given by said first drive mechanisms and the pressing forces given by said second drive mechanisms.

(2) The spot welding machine according to (1), wherein said first drive mechanisms and said second drive mechanisms are independently a pneumatic cylinder, hydraulic cylinder, or electric cylinder.

(3) The spot welding machine according to (1) or (2), wherein said pressing members are composed of a conductor and connected to said first power supply.

(4) The spot welding machine according to (1) or (2), wherein
said spot welding machine is further provided with a second power supply, and
said pressing members are composed of a conductor and connected to said second power supply.

(5) A spot welding method for welding a set of sheets including a superposed plurality of metal sheets by resistance spot welding, said spot welding method comprising:
preparing said set of sheets,
placing a first electrode tip and second electrode tip to face each other across said set of sheets,
placing a first pressing member around the first electrode tip and placing a second pressing member around said second electrode tip such that the second pressing member faces said first pressing member across said set of sheets,
pressing the front end parts of said first electrode tip and said second electrode tip against said set of sheets to apply pressing forces,
pressing the front end parts of said first pressing member and said second pressing member against said set of sheets to apply pressing forces independent from the pressing forces applied from said first electrode tip and said second electrode tip, and
running current across said first electrode tip and said second electrode tip to weld said set of sheets while pressing said first electrode tip and said second electrode tip and said first pressing member and said second pressing member against said set of sheets to apply pressing forces.

(6) The spot welding method according to (5), wherein
said first pressing member and said second pressing member are composed of a conductor, and
the method further comprises running current across said first pressing member and said second pressing member.

(7) The spot welding method according to (5) or (6), further comprising pressing the front end parts of said first pressing member and said second pressing member against said set of sheets to apply pressing forces, then pressing the front end parts of said first electrode tip and said second electrode tip against said set of sheets to apply pressing forces.

(8) The spot welding method according to any one of (5) to (7), wherein
said first pressing member and said second pressing member are composed of a conductor, and
the method further comprises, after welding said set of sheets, running current across said first pressing member and said second pressing member, while not running current across said first electrode tip and said second electrode tip.

(9) The spot welding method according to any one of (5) to (8) wherein
said first pressing member and said second pressing member are composed of a conductor, and
the method further comprises, before welding said set of sheets, running current across said first pressing member and said second pressing member, while not running current across said first electrode tip and said second electrode tip.

Advantageous Effects of Invention

According to the spot welding machine or spot welding method of the present disclosure, since it is possible to independently control the pressing pressures of the electrode tips and the pressing pressures of the pressing members, it becomes possible to perform spot welding in which the desired nugget size is formed while suppressing spatter, even if the strengths or thicknesses of the metal sheets change.

DESCRIPTION OF EMBODIMENTS

The present disclosure covers a spot welding machine welding a set of sheets including a superposed plurality of metal sheets by resistance spot welding, the spot welding machine comprising a pair of electrode tips with front end parts to be pressed against the set of sheets, a pair of pressing members arranged around the electrode tips and with front end parts to be pressed against the set of sheets, a first power supply, first drive mechanisms and second drive mechanisms, and a pressing force control part, wherein the pair of electrode tips are arranged facing each other so as to be able to sandwich the set of sheets between them, the pair of pressing members are arranged facing each other so as to be able to sandwich the set of sheets between them, the pair of electrode tips are connected to the first power supply and the first drive mechanisms, the first drive mechanisms driving the pair of electrode tips in the axial directions of the electrode tips and making the pair of electrode tips stop at any positions and giving pressing forces pressing the pair of electrode tips against the set of sheets, the pair of pressing members are connected to the second drive mechanisms, the second drive mechanisms driving the pair of pressing members in the axial directions of the electrode tips and making the pair of pressing members stop at any positions and giving pressing forces pressing the pair of pressing members against the set of sheets, and the pressing force control part is connected to the first drive mechanisms and the second drive mechanisms and independently controls the pressing forces given by the first drive mechanisms and the pressing forces given by the second drive mechanisms.

According to the spot welding machine of the present disclosure, since it is possible to separately control the pressing pressures of the electrode tips and the pressing pressures of the pressing members, it becomes possible to broaden the range of suitable current forming the desired nugget size while suppressing spatter even if the strengths or thicknesses of the metal sheets change.

The "range of suitable current" means the range of current values from the minimum current value at which a nugget of the reference diameter is formed to the maximum current value at which a nugget of the reference diameter or more is formed without being accompanied with spatter. The range of suitable current is preferably 1.0 kA or more, more preferably 1.5 kA or more, still more preferably 1.8 kA or more, even more preferably 1.9 kA or more. The reference diameter is equal to $4\sqrt{t}$ ("t" is the sheet thickness).

The spot welding machine of the present disclosure is provided with a pair of electrode tips. The pair of electrode tips are arranged facing each other so as to sandwich between them the set of sheets including a superposed plurality of metal sheets. The pair of electrode tips have front end parts to be pressed against the set of sheets and sandwich the set of sheets between them.

The pair of electrode tips are connected to the first power supply and first drive mechanisms.

The first drive mechanisms drive the pair of electrode tips in the axial directions of the electrode tips and make them stop at any positions and give pressing forces pressing the pair of electrode tips against the set of sheets.

The first power supply can run current through the electrode tips at predetermined current values and number of cycles. Current can be run from the electrode tips to the set of sheets changed in accordance with the strengths and thicknesses of the metal sheets included in the set of sheets. For example, 4 to 15 kA of current can be run for a current running time of 5 to 50 cycles (power supply frequency 50 Hz).

The electrode tips are not particularly limited. Known ones may be used, but are preferably ones made of Cu, Cu—Cr alloy, or alumina dispersed Cu. The electrode tips may for example have 2 to 16 mm columnar shapes or front end part diameter 6 to 8 mm DR type (dome radius type), CF type (conical flat type), CR type (conical radius type), DF type (dome flat type), or D type front end part shapes.

The spot welding machine of the present disclosure is provided with a pair of pressing members. The pair of pressing members are arranged facing each other so as to be able to sandwich between them the set of sheets including a superposed plurality of metal sheets. The pair of pressing members have front end parts which can be pressed against the set of sheets and can sandwich the set of sheets between them. The pair of pressing members are arranged around the electrode tips so as to be able to press the front end parts against the set of sheets.

The material of the pressing members arranged around the electrode tips is not particularly limited so long as having heat resistance and having predetermined mechanical characteristics enabling the members to press against the set of sheets, but preferably is an aromatic resin polyether ketone (PEEK) or other resin or Cu, a Cu—Cr alloy, or alumina dispersed Cu, or other conductor.

The shapes of the pressing members are not particularly limited so long as the members can be arranged around the electrode tips and can press against the set of sheets, but may be cylindrical shapes, partial circular shapes of cylindrical shapes partially cut away, or polygonal shapes. The cross-sections of the cylindrical shapes may be true circles or ellipses.

The inside diameters of the pressing members can be made 1.1 to 2.0 times the diameters of the electrode tips. The thicknesses of the pressing members can for example be 1 to 5 mm. The pressing members may also be cylindrical members with diameters of 15 to 25 mm.

The pressing members are connected to the second drive mechanisms. The second drive mechanisms drive the pair of pressing members in the axial directions of the electrode tips and make them stop at any positions and give pressing forces pressing the pair of pressing members against the set of sheets.

The pressing force control part is connected to the first drive mechanisms and second drive mechanisms and independently controls the pressing forces given by the first drive mechanisms and the pressing forces given by the second drive mechanisms.

The nugget diameter can be made $3.5\sqrt{t}$ to $8.0\sqrt{t}$ when the thickness of the thinnest steel sheet is "t" (mm).

First Drive Mechanisms

The first drive mechanisms connected to the electrode tips are not particularly limited so long as able to make the pair of electrode tips move in the axial directions of the electrode tips, make them stop at any positions, and give pressing forces pressing the pair of electrode tips against the set of sheets. The electrode tips can be moved relative to the pressing members.

The pressing forces given from the electrode tips to the set of sheets can be changed according to the strengths and thicknesses of the metal sheets included in the set of sheets, for example, can be made 0.0 to 6.0 kN or 1.5 to 4.5 kN.

Second Drive Mechanisms

The second drive mechanisms connected to the pressing members are not particularly limited so long as able to make the pressing members move in the axial directions of the electrode tips, make them stop at any positions, and give pressing forces pressing the pressing members against the set of sheets including a superposed plurality of metal sheets. The pressing members can be moved relative to the electrode tips.

The pressing forces given from the pressing members to the set of sheets can be changed according to the strengths and thicknesses of the metal sheets included in the set of sheets, for example, can be made 0.0 to 6.0 kN or 1.5 to 4.5 kN.

The first drive mechanisms and second drive mechanisms are independently preferably pneumatic cylinders, hydraulic cylinders, electric cylinders, actuators, gear drives, or racks and pinions, more preferably pneumatic cylinders, hydraulic cylinders, or electric cylinders. They may be selected from the above drive mechanisms according to the actual installation environment etc.

A pneumatic cylinder will not contaminate other members even if the air leaks and is easy to maintain. A hydraulic cylinder is strong against heat and can give large power. An electric cylinder does not require piping and can be controlled with a high precision.

The pressing members are, preferably, composed of a conductor and are connected to the first power supply. Due to this, it is possible to electrically heat the set of sheets from the pressing members as well. It is possible to electrically heat the set of sheets from the pressing members in addition to the electrode tips to thereby enlarge the nugget size. Therefore, even if spot welding a set of sheets including a 1180 MPa or more high strength steel sheet, it is possible to form the desired nugget size without causing spatter. The current run to the set of sheets by the pressing members can be changed in accordance with the strengths and thicknesses of the metal sheets included in the set of sheets. For example, it is possible to run 4 to 15 kA of current by a current carrying time of 5 to 50 cycles (power supply frequency 50 Hz).

If configuring the pressing members by a conductor, preferably the electrode tips and pressing members are insulated from each other. The insulation between the pressing members and electrode tips may be performed by a desired method. For example, arranging the pressing members and electrode tips separated and arranging insulating sleeves around the electrode tips between the electrode tips and pressing members etc. may be mentioned. If the electrode tips are held at the shanks, it is possible to arrange insulating sleeves around the electrode tips and the shanks.

The spot welding machine of the present disclosure may be further provided with a second power supply and have the pressing members composed of a conductor and connected to the second power supply. In this case, the current flowing through the electrode tips and the current flowing through the pressing members can be independently controlled, so it is possible to form the desired nugget size more precisely.

The spot welding machine of the present disclosure can be used to spot weld a set of sheets including a plurality of metal sheets. The plurality of metal sheets is not limited to two metal sheets. They may be made three or more metal sheets in accordance with the form of the structural parts to be joined. The thicknesses of the metal sheets are not particularly limited. For example, they may be made 0.5 to 3.2 mm. The thickness of the set of sheets including the plurality of metal sheets as a whole is also not particularly limited. For example, it may be made 1.0 to 7.0 mm.

The metal sheets may be ones formed with plating or other surface treatment films on both surfaces or on single surfaces or may be ones not formed with surface treatment films. The metal sheets need only be ones which have flat parts at least at parts of them and which can be stacked at parts of the flat parts. They need not be flat shapes overall. For example, they may also be steel shapes etc. The plurality of metal sheets are not limited to ones comprised of separate metal sheets. A single metal sheet may also be formed into a tube like or other predetermined shape superposed.

The configuration of the spot welding machine of the present disclosure will be explained while referring to the figures.

Figure 1:
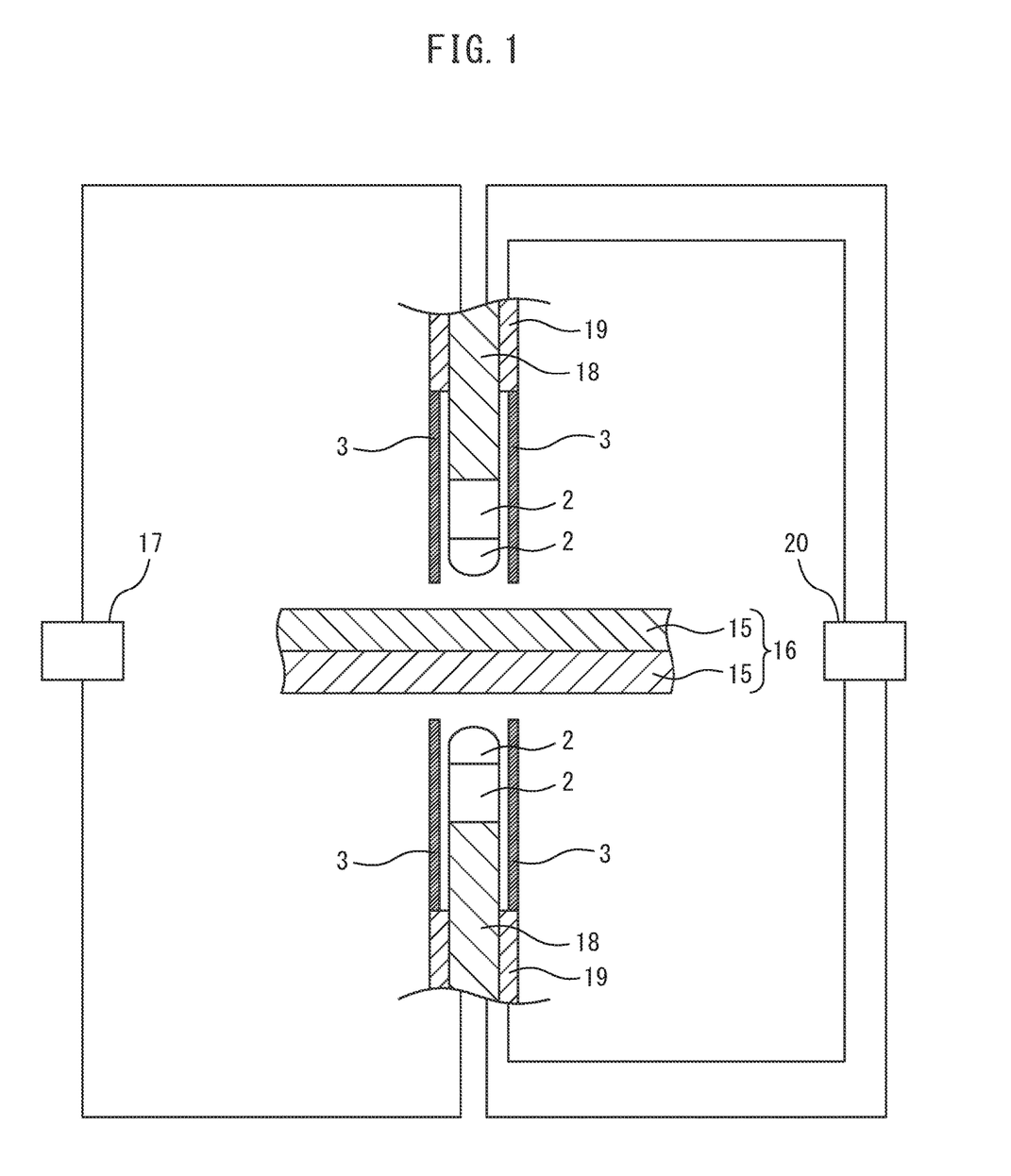
FIG. 1 is a cross-sectional schematic view showing one example of using a welding apparatus of the present disclosure to spot weld a set of sheets including a plurality of metal sheets.

FIG. 1 shows a cross-sectional schematic view showing one example of an embodiment using the welding machine of the present disclosure to spot weld a set of sheets including a plurality of metal sheets.

The welding machine shown in FIG. 1 is comprised of a pair of electrode tips 2 with front end parts to be pressed against a set of sheets 16, a pair of pressing members 3 arranged around the electrode tips 2 and with front end parts to be pressed against the set of sheets 16, a first power supply 17 connected to the pair of electrode tips 2, first drive mechanisms 18 connected to the pair of electrode tips 2, second drive mechanisms 19 connected to the pair of pressing members 3, and a pressing force control part 20 connected to the first drive mechanisms 18 and second drive mechanisms 19.

The first drive mechanisms 18 can drive the pair of electrode tips 2 in the axial directions of the electrode tips 2 and make them stop at any positions and give pressing forces pressing the pair of electrode tips 2 against the set of sheets 16. The second drive mechanisms 19 can drive the pair of pressing members 3 in the axial directions of the electrode tips 2 and make them stop at any positions and give pressing forces pressing the pair of pressing members 3 against the set of sheets 16.

The pressing force control part 20 independently controls the pressing forces given by the first drive mechanisms 18 and the pressing forces given by the second drive mechanisms 19.

The first drive mechanisms 18 connected to the pair of electrode tips 2 may be configured as a pair of separate mechanisms or may be configured as an integral mechanism. The second drive mechanisms 19 connected to the pair of pressing members 3 similarly may be configured as a pair of separate mechanisms or may be configured as an integral mechanism.

The pair of electrode tips 2 and the pair of pressing members 3 sandwich the set of sheets 16 including a plurality of metal sheets from its two sides. In FIG. 1, a state is illustrated in which a set of sheets 16 of two metal sheets 15 is sandwiched.

At the time of spot welding, the front end parts of the electrode tips 2 are pressed against the set of sheets 16. At that time, the front end parts of the electrode tips 2 and the front end parts of the pressing members 3 may also simultaneously be pressed against the set of sheets 16, the front end parts of the pressing members 3 may be pressed against the set of sheets 16 and then the front end parts of the electrode tips 2 be pressed against the set of sheets 16, or the front end parts of the electrode tips 2 may be pressed against the set of sheets 16 and then the front end parts of the pressing members 3 be pressed against the set of sheets 16.

Figure 2:
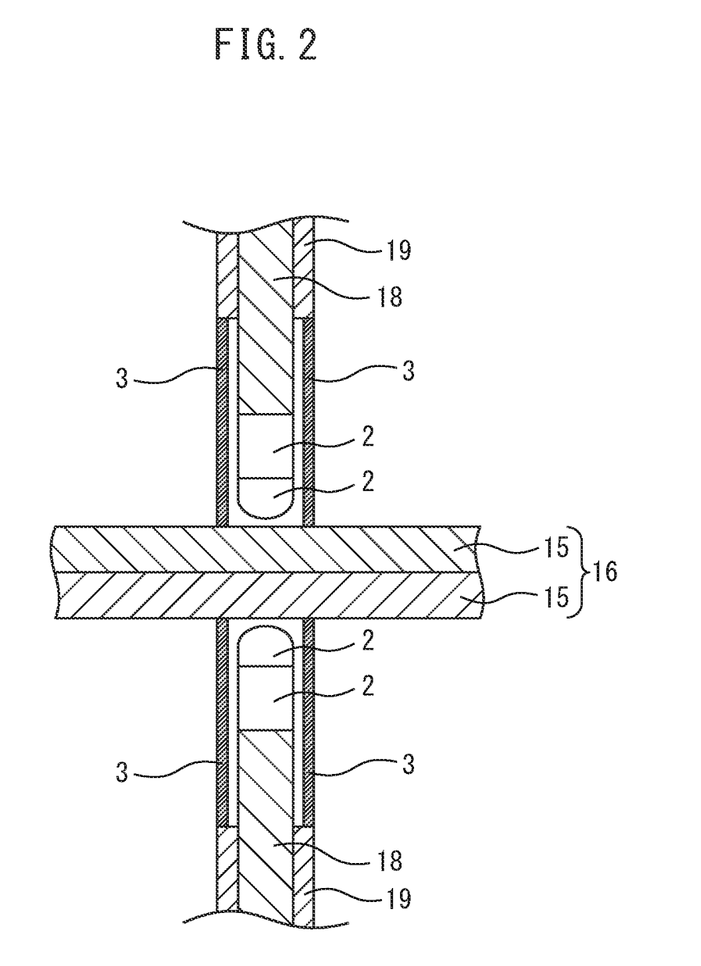
FIG. 2 is a cross-sectional schematic view showing an embodiment when pressing the front end parts of the pressing members against the set of sheets and placing the front end parts of the electrode tips at positions separated from the set of sheets.

Preferably, as shown in FIG. 2, before the spot welding, the front end parts of the pressing members 3 are pressed against the set of sheets 16 and the front end parts of the electrode tips 2 are placed at positions separated from the set of sheets 16. FIG. 2 is a cross-sectional schematic view showing a state when pressing the front end parts of the pressing member 3 against the set of sheets 16 and placing the front end parts of the electrode tips 2 at positions separated from the set of sheets 16. When pressing the front end parts of the pressing members 3 against the set of sheets 16 and placing the front end parts of the electrode tips 2 at positions separated from the set of sheets 16, the front end parts of the electrode tips 2 may be placed at positions separated from the set of sheets by for example 0 to 5 mm or 1 to 3 mm.

Figure 3:
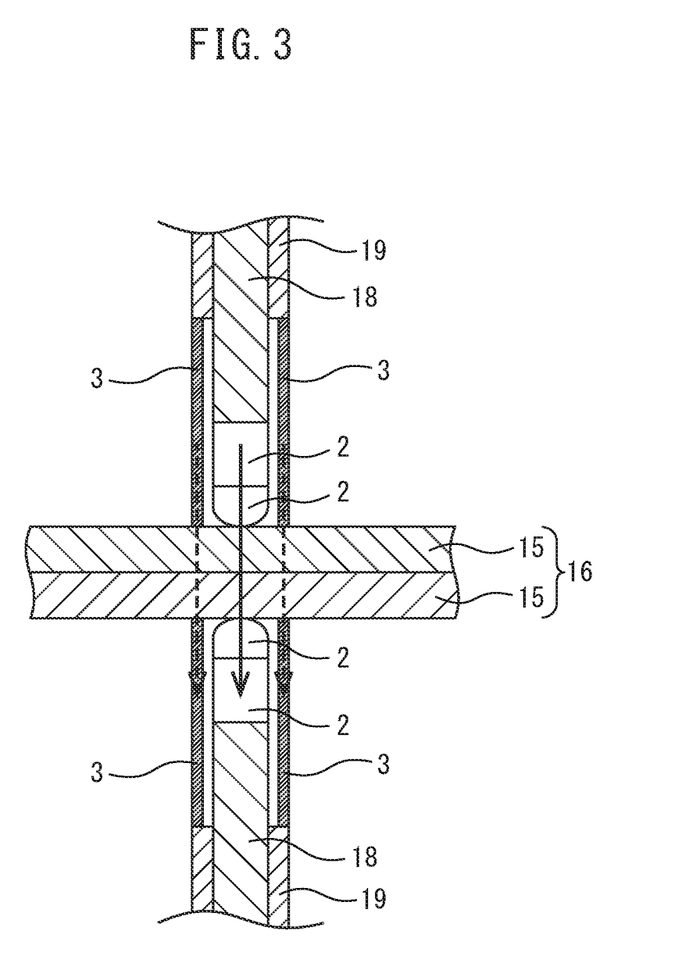
FIG. 3 is a cross-sectional schematic view showing an embodiment when pressing the front end parts of the electrode tips and front end parts of the pressing members against the set of sheets.

As shown in FIG. 2, it is possible to press the front end parts of the pressing members 3 against the set of sheets 16, place the front end parts of the electrode tips 2 at positions separated from the set of sheets 16, then make the electrode tips 2 move relative to the pressing members 3 to, as shown in FIG. 3, make the electrode tips 2 contact the metal sheets 15. FIG. 3 is a cross-sectional schematic view showing the state when pressing the front end parts of the electrode tips 2 and the front end parts of the pressing members 3 against the set of sheets 16.

In FIG. 2, before making the electrode tips 2 contact the set of sheets 16, the pressing members 3 can be used to press against the set of sheets 16 by the desired pressing forces, so in FIG. 3, it is possible to run current simultaneously with making the electrode tip 2 contact the set of sheets 16 and possible to shorten the tact time of the spot welding. In FIG. 2 and FIG. 3 as well, the spot welding machine is provided with the first power supply 17 and pressing force control part 20, but these are not shown.

As shown in FIG. 3, it is possible to run current across the facing electrode tips 2 in the state pressing the electrode tips 2 and pressing members 3 against the set of sheets 16 and form molten metal at the superposed surfaces of the metal sheets 15. Since spot welding is conducted while pressing the surroundings of the weld zone by the pressing members, spatter can be suppressed. The pressing forces of the pressing members may be made larger than the pressing forces of the electrode tips corresponding to the strengths or thicknesses of the metal sheets contained in the set of sheets, may be made the same extents as the pressing forces of the electrode tips, or may be made zero.

As shown by the solid line arrow in FIG. 3, it is possible to run current across the facing electrode tips 2 to form molten metal at the superposed surfaces of the metal sheets 15. If the pressing members 3 are composed of a conductor and are connected to the first power supply, as shown by the broken line arrow, it is possible to run current across the facing pressing members 3 to form molten metal at the superposed surfaces of the metal sheets 15.

After finishing running current, it is possible to make the molten metal quickly cool and solidify by the removal of heat by cooling the electrode tips 2 or conduction of heat to the metal sheets 15 themselves and form a nugget with an elliptical shaped cross-section between the metal sheets 15. After formation of the nugget, it is possible to separate the electrode tips and pressing members from the metal sheets to return the welding machine to the standby state for welding.

Figure 4:
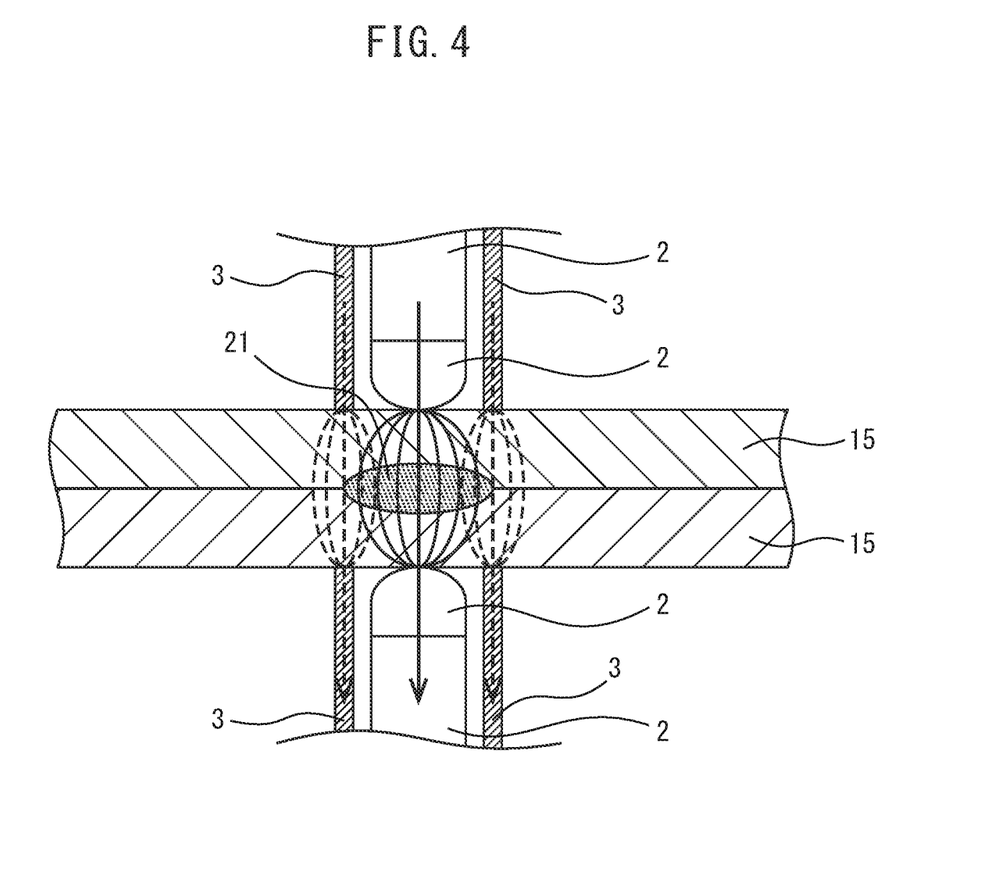
FIG. 4 is a cross-sectional schematic view of a nugget formed when performing electric heating by the electrode tips and pressing members.
Figure 5:
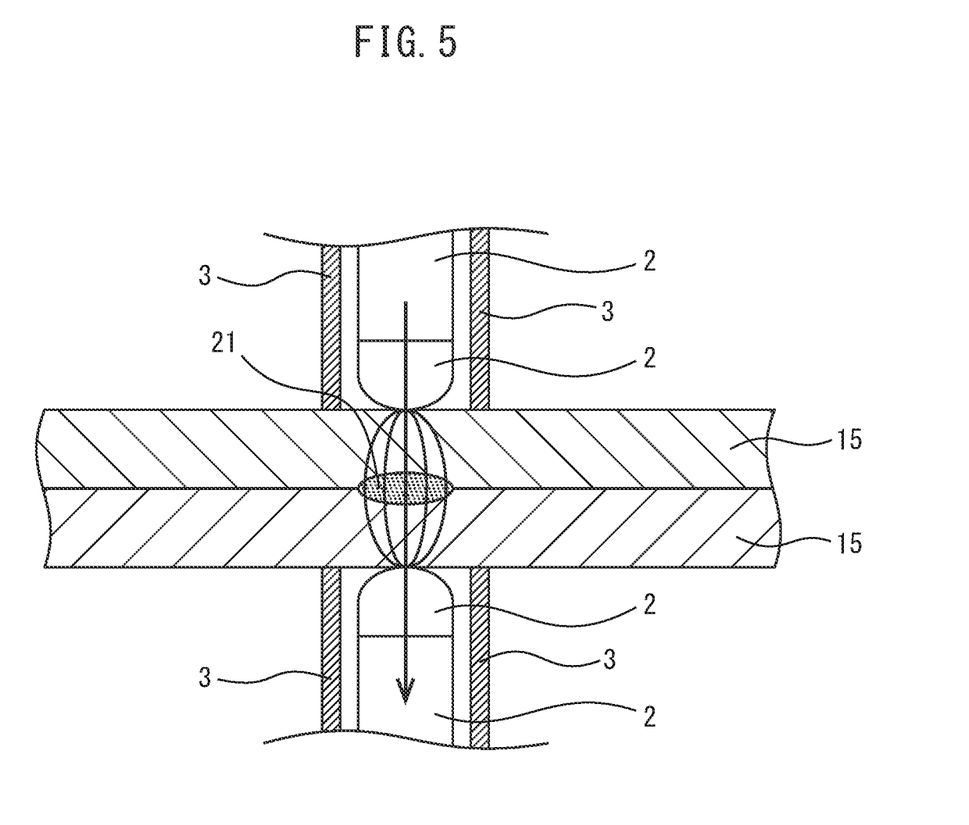
FIG. 5 is a cross-sectional schematic view of a nugget formed when running current through only the electrode tips and not performing electric heating by the pressing members.

FIGS. 4 and 5 are cross-sectional schematic views of a nugget formed when electrically heating by the pressing members and when not. FIG. 4 shows the state when electrically heating by the pressing members, while FIG. 5 shows the state when not electrically heating by the pressing members.

The molten metal 21 when electrically heating the metal sheets 15 by the pressing members 3 shown in FIG. 4 becomes greater in diameter (length in direction parallel to superposed surfaces of metal sheets) compared with the molten metal 21 when not electrically heating the metal sheets 15 by the pressing members 3 shown in FIG. 5. This is because, as shown by the broken line arrow in FIG. 4, by running current across the pressing members 3, the outer circumference of the molten metal of the metal sheets is sufficiently heated and the diameter of the molten metal 16 becomes larger. As a result, the nugget size becomes greater.

Next, the size of the nugget formed by the presence or absence of pressing members and presence or absence of electric heating and the range of suitable current are shown as one example.

Example 1

Cold rolled members (unplated) of sheet thicknesses of 1.6 mm and tensile strengths of 590 MPa were superposed to form a set of two sheets. DR type front end part 40R, front end part diameter 6 mm Cu—Cr alloy electrode tips and Cu—Cr alloy pressing members were used. Spot welding was performed while making the pressing forces of both the electrode tips and pressing members 3.92 kN and making the current running time 18 cycles (60 Hz). As a result, the range between the current value giving a nugget size of $4\sqrt{t}$ ("t"=1.6 mm) and the current value right before spatter (range of suitable current) became 3.2 kA. Further, the maximum nugget size was 7.5 mm.

Example 2

Except for using pressing members of the insulator constituted by the aromatic resin polyether ketone (PEEK), welding was performed under conditions similar to Example 1. As a result, the range between the current value giving a nugget size of $4\sqrt{t}$ ("t"=1.6 mm) and the current value right before spatter (range of suitable current) became 2.8 kA. Further, the maximum nugget size was 6.6 mm.

Example 3

Except for not using pressing members, welding was performed under conditions similar to Example 1. As a result, the range between the current value giving a nugget size of $4\sqrt{t}$ ("t"=1.6 mm) and the current value right before spatter (range of suitable current) became 1.8 kA. Further, the maximum nugget size was 6.6 mm.

Next, one example of the nugget size and range of suitable current when welding metal sheets with thicknesses and tensile strengths different from Examples 1 to 3 will be shown.

Example 4

A cold rolled member (unplated) of a sheet thickness of 2.0 mm and a tensile strength of 1180 MPa and a cold rolled member (unplated) of a sheet thickness of 2.0 mm and a tensile strength of 1180 MPa were superposed to form a set of two sheets. DR type front end part 40R, front end part diameter 6 mm Cu—Cr alloy electrode tips and Cu—Cr alloy pressing members were used. Spot welding was performed while making the pressing forces of both the electrode tips and pressing members 3.92 kN and making the current running time 18 cycles (50 Hz). As a result, the range between the current value giving a nugget size of $4\sqrt{t}$ ("t"=2.0 mm) and the current value right before spatter (range of suitable current) became 1.0 kA. Further, the maximum nugget size was 6.6 mm.

Example 5

Except for making the pressing forces of the electrode tips 3.92 kN and making the pressing forces of the pressing members 4.91 kN, welding was performed under conditions similar to Example 4. As a result, the range between the current value giving a nugget size of $4\sqrt{t}$ ("t"=2.0 mm) and the current value right before spatter (range of suitable current) became 1.9 kA. Further, the maximum nugget size was 7.8 mm.

Example 6

Except for using pressing members of the insulator constituted by the aromatic resin polyether ketone (PEEK), welding was performed under conditions similar to Example 5. As a result, the range between the current value giving a nugget size of $4\sqrt{t}$ ("t"=2.0 mm) and the current value right before spatter (range of suitable current) became 1.5 kA. Further, the maximum nugget size was 7.0 mm.

Example 7

Except for not using pressing members, welding was performed under conditions similar to Example 4. As a result, the range between the current value giving a nugget size of $4\sqrt{t}$ ("t"=2.0 mm) and the current value right before spatter (range of suitable current) became 0.0 kA. Further, the maximum nugget size was 6.0 mm.

Example 8

A cold rolled member (unplated) of a sheet thickness of 1.6 mm and a tensile strength of 590 MPa and a cold rolled member (unplated) of a sheet thickness of 2.0 mm and a tensile strength of 1180 MPa were superposed to form a set of two sheets. DR type front end part 40R, front end part diameter 6 mm Cu—Cr alloy electrode tips and Cu—Cr alloy pressing members were used. Spot welding was performed making the pressing forces of both the electrode tips and pressing members 3.92 kN and making the current running time 18 cycles (50 Hz). As a result, the range between the current value giving a nugget size of $4\sqrt{t}$ ("t"=1.6 mm) and the current value right before spatter (range of suitable current) became 1.5 kA. Further, the maximum nugget size was 6.6 mm.

Example 9

Except for making the pressing forces of the electrode tips 3.92 kN and making the pressing forces of the pressing members 4.91 kN, welding was performed under conditions similar to Example 8. As a result, the range between the current value giving a nugget size of $4\sqrt{t}$ ("t"=1.6 mm) and the current value right before spatter (range of suitable current) became 2.8 kA. Further, the maximum nugget size was 7.8 mm.

Example 10

Except for using pressing members of the insulator constituted by the aromatic resin polyether ketone (PEEK), welding was performed under conditions similar to Example 9. As a result, the range between the current value giving a nugget size of $4\sqrt{t}$ ("t"=1.6 mm) and the current value right before spatter (range of suitable current) became 2.0 kA. Further, the maximum nugget size was 7.0 mm.

By conducting spot welding while independently controlling the pressing pressures of the electrode tips and the pressing pressures of the pressing members to press the surroundings of the weld zone, a large range of suitable current can be obtained and the nugget size can be enlarged while suppressing spatter.

The electrode tips 2 can be cooled by any method. For example, if making the shanks hold the electrode tips, it is possible to cool the shanks to cool the electrode tips. Cooling pipes may also be placed inside the shanks.

It is also possible to repeat the spot welding a predetermined number of times, then dress the electrode tips or replace them. According to the welding machine of the present disclosure, the electrode tips and pressing members can be independently moved and stopped at the desired positions, so dressing and replacement of electrode tips become easy.

The method of dressing the electrode tips is not particularly limited. For example, the surfaces of the front end parts of the electrode tips may be ground to thicknesses of 0.1 to 1.0 mm. The electrode tips 2 may be changed by using a robot etc. to detach the electrode tips and attach new electrode tips. The method is not particularly limited.

The present disclosure further covers a spot welding method for welding the set of sheets including a superposed plurality of metal sheets by resistance spot welding, the spot welding method comprising preparing the set of sheets, placing a first electrode tip and second electrode tip to face each other across the set of sheets, placing a first pressing member around the first electrode tip and placing a second pressing member around the second electrode tip such that the second pressing member faces the first pressing member across the set of sheets, pressing the front end parts of the first electrode tip and the second electrode tip against the set of sheets to apply pressing forces, pressing the front end parts of the first pressing member and the second pressing member against the set of sheets to apply pressing forces independent from the pressing forces applied from the first electrode tip and the second electrode tip, and running current across the first electrode tip and said second electrode tip to weld said set of sheets while pressing the first electrode tip and the second electrode tip and also the first pressing member and the second pressing member against the set of sheets to apply pressing forces.

In the spot welding method of the present disclosure, as the welded members, a set of sheets of a plurality of metal sheets with superposed welding locations is prepared. The metal sheets are not particularly limited. Steel sheets of various chemical compositions are possible. Alternatively, aluminum, stainless steel, or other metal members other than steel sheets are also possible.

According to the spot welding method of the present disclosure, it is possible to perform spot welding well without regard as to the thicknesses or strengths of the metal sheets. For example, it is possible to perform spot welding well even if including mild steel with a tensile strength of 270 MPa or 590 MPa or more, 980 MPa or more, 1180 MPa or more, or 1480 MPa or more high strength steel sheet. Regarding the thicknesses of the metal sheets, steel sheets of a thickness of 0.5 to 3.2 mm may be illustrated.

Preferably the first pressing member and second pressing member are composed of a conductor. Current is also run across the first pressing member and second pressing member. Due to this, the nugget size can be made larger.

Preferably the front end parts of the first pressing member and second pressing member are pressed against the set of sheets to apply pressing forces, then the front end parts of the first electrode tip and second electrode tip are pressed against the set of sheets to apply pressing forces. Due to this, the tact time of spot welding can be reduced.

Preferably, the first pressing member and the second pressing member are composed of a conductor, and after welding the set of sheets, current is not run across the first electrode tip and the second electrode tip but is run across the first pressing member and the second pressing member. By later running current from the pressing members, it is possible to run current to the ends of the nugget for tempering it, so it is possible to improve the CTS (cross tensile strength).

Preferably, the first pressing members and second pressing members are composed of a conductor, and before welding the set of sheets, current is not run across the first electrode tip and the second electrode tip but is run across the first pressing member and the second pressing member. By earlier running current from the pressing members, it is possible to more stably prevent spatter.

The above explanation relating to the configuration of the spot welding machine also applies to the configuration of the spot welding method.

Figure 6:
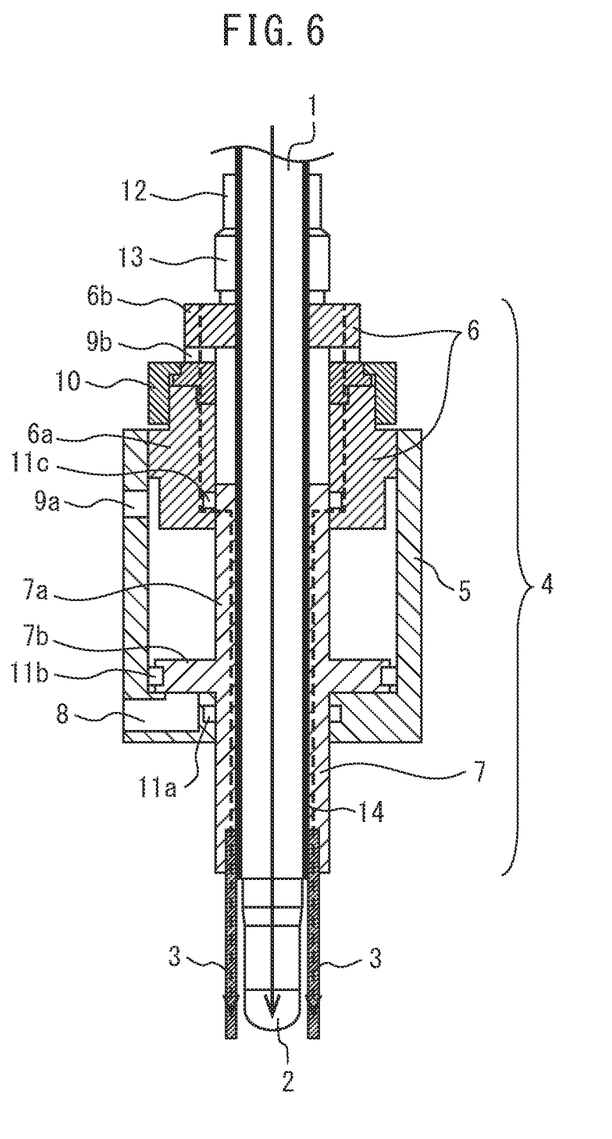
FIG. 6 is a cross-sectional schematic view showing one example of a welding apparatus of the present disclosure when using a pneumatic cylinder as a second drive device.

FIG. 6 is a cross-sectional schematic view of one example of a welding machine of the present disclosure using pneumatic cylinders as the second drive mechanisms. The first drive mechanisms are preferably pneumatic cylinders, but may also be hydraulic cylinders, electric cylinders, etc. In FIG. 6, the first drive mechanisms are not shown, but when the first drive mechanisms are pneumatic cylinders, they may be configured in the same way as the pneumatic cylinders of the second drive mechanisms illustrated in FIG. 6.

The electrode tips 2 are attached to rod-shaped shanks 1. The shanks 1 are attached to holders (not shown) attached to spot welding guns. The pressing members 3 are arranged around the electrode tips 2. The first power supply and pressing force control part are not shown.

The welding machine is provided with a pair of electrode tips and a pair of pressing members. The welding machine is used arranging the electrode tips and pressing members so as to face each other across the superposed plurality of metal sheets. Since the basic configurations of the two welding guns arranged facing each other are the same, one welding gun will be explained below.

The shank 1 and electrode tip 2 can move relative to the pneumatic cylinder 4. The shank 1 is fastened to the pneumatic cylinder 4 by a Cu-1 mass % Cr screw adaptor 12 and nut 13.

Around the shank 1, a nylon insulating sleeve 14 is arranged. The insulating sleeve 14 may also extend up to near the front end part of the electrode tip.

The second drive mechanism constituted by the pneumatic cylinder 4 has a substantially cylindrically shaped cylinder housing 5 in which the shank 1 is inserted, a disk-shaped rod cover 6 closing the cylinder housing 5, and a piston rod 7 moving through the inside of the cylinder housing 5 in the axial direction of the shank 1. The piston rod 7 has a cylindrically shaped rod part 7a into which the shank 1 is inserted and a ring part 7b formed around the rod part 7a and is formed by SUS304 etc.

The cylinder housing 5 has ports 8 and 9a supplying and discharging air for moving the piston rod 7 to the ring part 7b of the piston rod 7 at the side where the pressing member 3 is attached to the piston rod 7 (below, referred to as the "inside") and the rod cover 6 side (below, referred to as the "outside"). The cylinder housing 5 is formed by SUS304 etc.

The rod cover 6 has a lower cover 6a restricting the range of movement of the piston rod 7 and upper cover 6b having a port 9b supplying and discharging air at the outside of the rod part 7a of the piston rod 7 and is formed by SUS304 etc. The lower cover 6a and the upper cover 6b are fastened by bag nuts 10.

The cylinder housing 5, piston rod 7, and lower cover 6a are respectively provided with O-rings 11a, 11b, 11c. By keeping down the movement of compressed air between the inside and outside at the ring part 7b of the piston rod 7 and supplying and discharging compressed air through the port 8 and the ports 9a, 9b, it is possible move and stop the piston rod 7 and pressing member 3 connected to their front end parts.

The flow of current at the time of spot welding will be explained using FIG. 6. At the electrode tip 2, when spot welding, current flows through the shank 1 as shown by the solid line arrow. Due to this, the welding location of the metal sheets is heated and a nugget is formed. Further, when configuring the pressing member 3 by a conductor, it is possible to use not only the electrode tip 2, but also the pressing member 3 to electrically heat the metal sheets. When spot welding is conducted, current flows to the pressing member 3 through the rod cover 6 and piston rod 7 (also sometimes through the cylinder housing 5) as shown by the broken arrow mark. Due to this, the metal sheets are sufficiently heated and the nugget size can be enlarged.

The direction of the current (arrow direction) is not particularly limited and may be an opposite direction as well.

Figure 7:
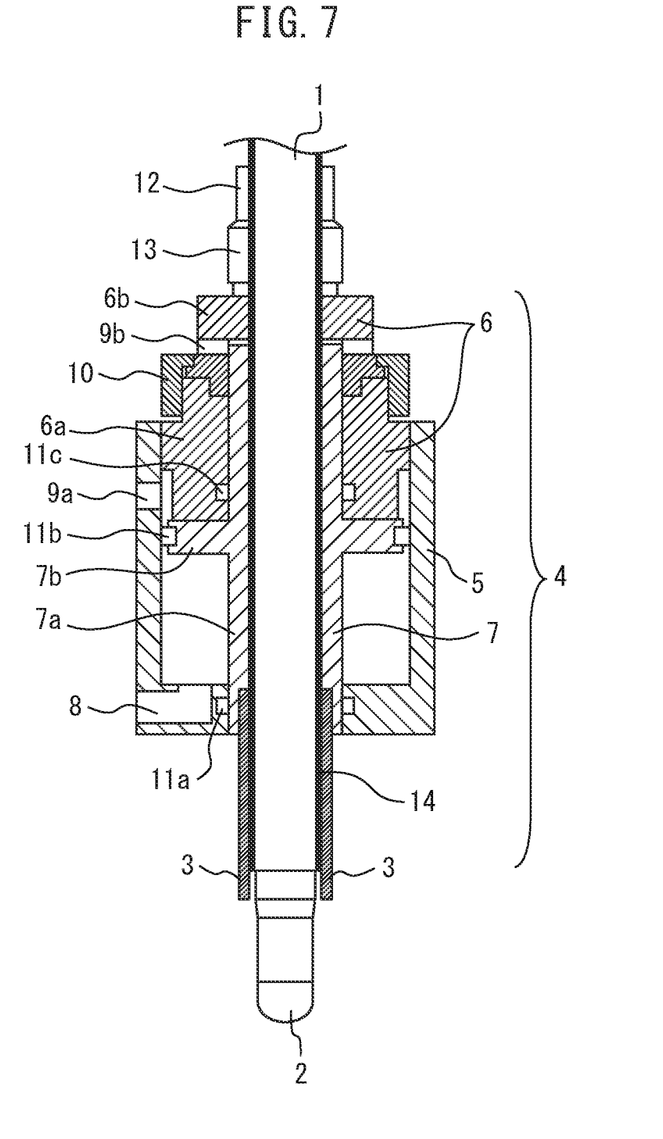
FIG. 7 is a cross-sectional schematic view when making pressing members of the welding machine of FIG. 6 move.

FIG. 7 is a cross-sectional schematic view when making the pressing member 3 of the welding machine of FIG. 6 move to the outside.

The pressing member 3 moves via the piston rod 7 by supplying and discharging compressed air through the port 8 and ports 9a, 9b. As shown in FIG. 7, the piston rod 7 is made to move and stop by compressed air until the position limited by the inside cover 6a.

The material of the shank is not particularly limited so long as able to hold the electrode tip and apply pressing force from the electrode tip to the set of sheets, but for example it may be made of Cu—Cr alloy etc. and be provided with a cooling pipe at the inside thereof. The holder is not particularly limited so long as one able to attach the shank 1, but for example it may be made of Cu—Cr alloy etc. and be provided with a cooling pipe at the inside thereof.

REFERENCE SIGNS LIST 1 shank
2 electrode tip
3 pressing member
4 pneumatic cylinder
5 cylinder housing
6 rod cover
6a lower cover
6b upper cover
7 piston rod
7a rod part
7b ring part
8 port
9a, 9b port
10 bag nut
11a, 11b, 11c O-ring
12 screw adaptor
13 nut
14 insulating sleeve
15 metal sheet
16 set of sheets
17 first power supply
18 first drive mechanism
19 second drive mechanism
20 pressing force control part
21 molten metal

The invention claimed is:

1. A spot welding machine welding a set of sheets including a superposed plurality of metal sheets by resistance spot welding,
said spot welding machine comprising:
a pair of electrode tips with front end parts to be pressed against said set of sheets,
a pair of pressing members arranged around said electrode tips and with front end parts to be pressed against said set of sheets,
a first power supply,
first drive mechanisms and second drive mechanisms, and
a pressing force control part having a compressed air supply, wherein
said pair of electrode tips are arranged facing each other so as to be able to sandwich said set of sheets between them,
said pair of pressing members are arranged facing each other so as to be able to sandwich said set of sheets between them,
said pair of electrode tips are connected to said first power supply and said first drive mechanisms, said first drive mechanisms driving said pair of electrode tips in the axial direction of said electrode tips and making said pair of electrode tips stop at any positions and giving pressing forces pressing said pair of electrode tips against said set of sheets, said pair of pressing members are connected to said second drive mechanisms, said second drive mechanisms driving said pair of pressing members in the axial direction of said electrode tips and making said pair of pressing members stop at any positions and giving pressing forces pressing said pair of pressing members against said set of sheets, and said pressing force control part is connected to said first drive mechanisms and said second drive mechanisms and independently controls the pressing forces given by said first drive mechanisms and the pressing forces given by said second drive mechanisms, said spot welding machine is further provided with a second power supply, and said pressing members are composed of a conductor and connected to said second power supply.

2. The spot welding machine according to claim 1, wherein each of the said said first drive mechanisms and said second drive mechanisms are selected from a pneumatic cylinder, hydraulic cylinder, or electric cylinder.

3. A spot welding method for welding a set of sheets including a superposed plurality of metal sheets by resistance spot welding, said spot welding method comprising:
preparing said set of sheets,
placing a first electrode tip and second electrode tip to face each other across said set of sheets,
placing a first pressing member around the first electrode tip and placing a second pressing member around said second electrode tip such that the second pressing member faces said first pressing member across said set of sheets,
pressing the front end parts of said first electrode tip and said second electrode tip against said set of sheets to apply pressing forces,
pressing the front end parts of said first pressing member and said second pressing member against said set of sheets to apply pressing forces independent from the pressing forces applied from said first electrode tip and said second electrode tip, and
running current across said first electrode tip and said second electrode tip to weld said set of sheets while pressing said first electrode tip and said second electrode tip and said first pressing member and said second pressing member against said set of sheets to apply pressing forces,
wherein
said first pressing member and said second pressing member are composed of a conductor, and
the method further comprises, after welding said set of sheets, running current across said first pressing member and said second pressing member, while not running current across said first electrode tip and said second electrode tip.

4. The spot welding method according to claim 3, wherein
said first pressing member and said second pressing member are composed of a conductor, and
the method further comprises running current across said first pressing member and said second pressing member while running current across said first electrode tip and said second electrode tip to weld said set of sheets.

5. The spot welding method according to claim 3, further comprising pressing the front end parts of said first pressing member and said second pressing member against said set of sheets to apply pressing forces, then pressing the front end parts of said first electrode tip and said second electrode tip against said set of sheets to apply pressing forces.

6. A spot welding method for welding a set of sheets including a superposed plurality of metal sheets by resistance spot welding, said spot welding method comprising:
preparing said set of sheets,
placing a first electrode tip and second electrode tip to face each other across said set of sheets,
placing a first pressing member around the first electrode tip and placing a second pressing member around said second electrode tip such that the second pressing member faces said first pressing member across said set of sheets,
pressing the front end parts of said first electrode tip and said second electrode tip against said set of sheets to apply pressing forces,
pressing the front end parts of said first pressing member and said second pressing member against said set of sheets to apply pressing forces independent from the pressing forces applied from said first electrode tip and said second electrode tip, and
running current across said first electrode tip and said second electrode tip to weld said set of sheets while pressing said first electrode tip and said second electrode tip and said first pressing member and said second pressing member against said set of sheets to apply pressing forces,
wherein
said first pressing member and said second pressing member are composed of a conductor, and
the method further comprises, before welding said set of sheets, running current across said first pressing member and said second pressing member, while not running current across said first electrode tip and said second electrode tip.

7. The spot welding method according to claim 4, further comprising pressing the front end parts of said first pressing member and said second pressing member against said set of sheets to apply pressing forces, then pressing the front end parts of said first electrode tip and said second electrode tip against said set of sheets to apply pressing forces.

8. The spot welding method according to claim 4, wherein
said first pressing member and said second pressing member are composed of a conductor, and
the method further comprises, before welding said set of sheets, running current across said first pressing member and said second pressing member, while not running current across said first electrode tip and said second electrode tip.

9. The spot welding method according to claim 5, wherein
said first pressing member and said second pressing member are composed of a conductor, and
the method further comprises, before welding said set of sheets, running current across said first pressing member and said second pressing member, while not running current across said first electrode tip and said second electrode tip.

10. The spot welding method according to claim 3, wherein
said first pressing member and said second pressing member are composed of a conductor, and
the method further comprises, before welding said set of sheets, running current across said first pressing member and said second pressing member, while not running current across said first electrode tip and said second electrode tip.

* * * * *